United States Patent
Ayoub et al.

(10) Patent No.: US 11,064,550 B2
(45) Date of Patent: Jul. 13, 2021

(54) METHOD AND APPARATUS FOR MOBILE SESSION ESTABLISHMENT WITH RESILIENT CONNECTION STRATEGY

(71) Applicant: FORD GLOBAL TECHNOLOGIES, LLC, Dearborn, MI (US)

(72) Inventors: Issam Ayoub, Troy, MI (US); Said Abdallah, Royal Oak, MI (US); Ritesh Pandya, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 638 days.

(21) Appl. No.: 15/475,610

(22) Filed: Mar. 31, 2017

(65) Prior Publication Data
US 2018/0288814 A1 Oct. 4, 2018

(51) Int. Cl.
| H04W 76/19 | (2018.01) |
| H04L 29/06 | (2006.01) |
| H04L 29/08 | (2006.01) |
| H04W 76/18 | (2018.01) |
| H04W 4/70  | (2018.01) |
| H04W 4/80  | (2018.01) |
| H04W 4/14  | (2009.01) |

(52) U.S. Cl.
CPC ............ *H04W 76/19* (2018.02); *H04L 69/28* (2013.01); *H04L 69/327* (2013.01); *H04W 4/70* (2018.02); *H04W 76/18* (2018.02); *H04L 67/12* (2013.01); *H04W 4/14* (2013.01); *H04W 4/80* (2018.02); *Y02D 30/70* (2020.08)

(58) Field of Classification Search
None
See application file for complete search history.

(56) References Cited

U.S. PATENT DOCUMENTS

| 8,442,528 B2* | 5/2013 | Chmielewski | H04W 76/18 455/435.1 |
| 9,179,488 B2* | 11/2015 | Lei | H04W 76/19 |
| 2009/0172117 A1* | 7/2009 | Bedi | H04W 52/0229 709/206 |
| 2010/0248636 A1* | 9/2010 | Shibata | H04W 48/16 455/67.11 |
| 2011/0039559 A1 | 2/2011 | Yi et al. | |
| 2011/0149725 A1* | 6/2011 | Zhao | H04W 76/18 370/216 |
| 2015/0281374 A1* | 10/2015 | Petersen | H04L 67/16 709/223 |
| 2016/0063776 A1* | 3/2016 | Chronowski | B60Q 9/00 701/29.1 |
| 2016/0110987 A1* | 4/2016 | Hughes | H04W 4/029 340/573.4 |

\* cited by examiner

*Primary Examiner* — Dhairya A Patel
(74) *Attorney, Agent, or Firm* — Michael Spenner; Brooks Kushman P.C.

(57) ABSTRACT

A system includes a processor configured to attempt a packet-data connection for a first number of attempts, including a predetermined short delay between each unsuccessful attempt. The processor is also configured to delay for a longer predetermined delay determined based on a predetermined long delay less a total duration of preceding failed connection attempts, responsive to another failed connection attempt after failures for the first number of attempts, and repeat the attempt and delay steps until a connection is established.

4 Claims, 5 Drawing Sheets

METHOD AND APPARATUS FOR MOBILE SESSION ESTABLISHMENT WITH RESILIENT CONNECTION STRATEGY

TECHNICAL FIELD

The illustrative embodiments generally relate to methods and apparatuses for mobile session establishment with resilient reconnection strategy.

BACKGROUND

Vehicle telematics units provide connectivity and remote resource access to vehicle computing systems while a vehicle is traveling. Typically leveraging an onboard cellular modem or a local user device, the telematics control unit (TCU) connects to a remote service delivery network (SDN) to obtain original equipment manufacturer (OEM) telematics services. This can include, but is not limited to, music, advertising, vehicle software updates, diagnostics transfer and any other form of useful data transmission and reception.

In a common model, to establish a connection between the TCU and SDN, the TCU will establish a session with a mobile operator's core network and with an MQ telemetry transport (MQTT). The MQTT is the session layer protocol. The TCU establishes a session with a message broker (AKA MQTT), through which it communicates with the SDN. The message broker could be a separate entity from the SDN or integrated.

The connection to the mobile operator core network and/or the MQTT broker can fail for any number of reasons. This causes a service interruption and can diminish a customer experience, if the failure is at an important time (e.g., when the TCU is transferring customer-requested data). While certain paradigms for connection and retry already exist, they may lack aspects which could help ensure a resilient reconnection strategy.

SUMMARY

In a first illustrative embodiment, a system includes a processor configured to attempt a packet-data (PD) connection for a first number of attempts, including a predetermined short delay between each unsuccessful attempt. The processor is also configured to delay for a longer predetermined delay determined based on a predetermined long delay less a total duration of preceding failed connection attempts, responsive to another failed connection attempt after failures for the first number of attempts and repeat the attempt and delay steps until a connection is established.

In a second illustrative embodiment, a computer implemented method includes waking a powered down vehicle and requesting an MQTT connection. The method also includes waiting, for a predetermined timeout period based on expected connection time, until the requested MQTT connection is established. The method further includes starting a timer responsive to establishing the MQTT connection, sending any vehicle alerts pending in a queue, following MQTT connection establishment, and ending the MQTT connection, following expiration of the timer unless the vehicle has been powered before the timer expired.

In a third illustrative embodiment, a system includes a vehicle processor configured to request an MQTT connection, responsive to a vehicle ignition. The processor is also configured to wait for the duration of a first timer, predetermined based on an expected amount of time to establish the MQTT connection and remove the MQTT connection request, following expiration of the first timer. The processor is also configured to wait for a duration of a second timer, predetermined based on a delay expected to result in a further MQTT request not being rejected for being too proximate to a preceding MQTT connection request. Also, the processor is configured to repeat the request, wait for the first timer, remove and wait for the second timer steps until the requested MQTT connection is established.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
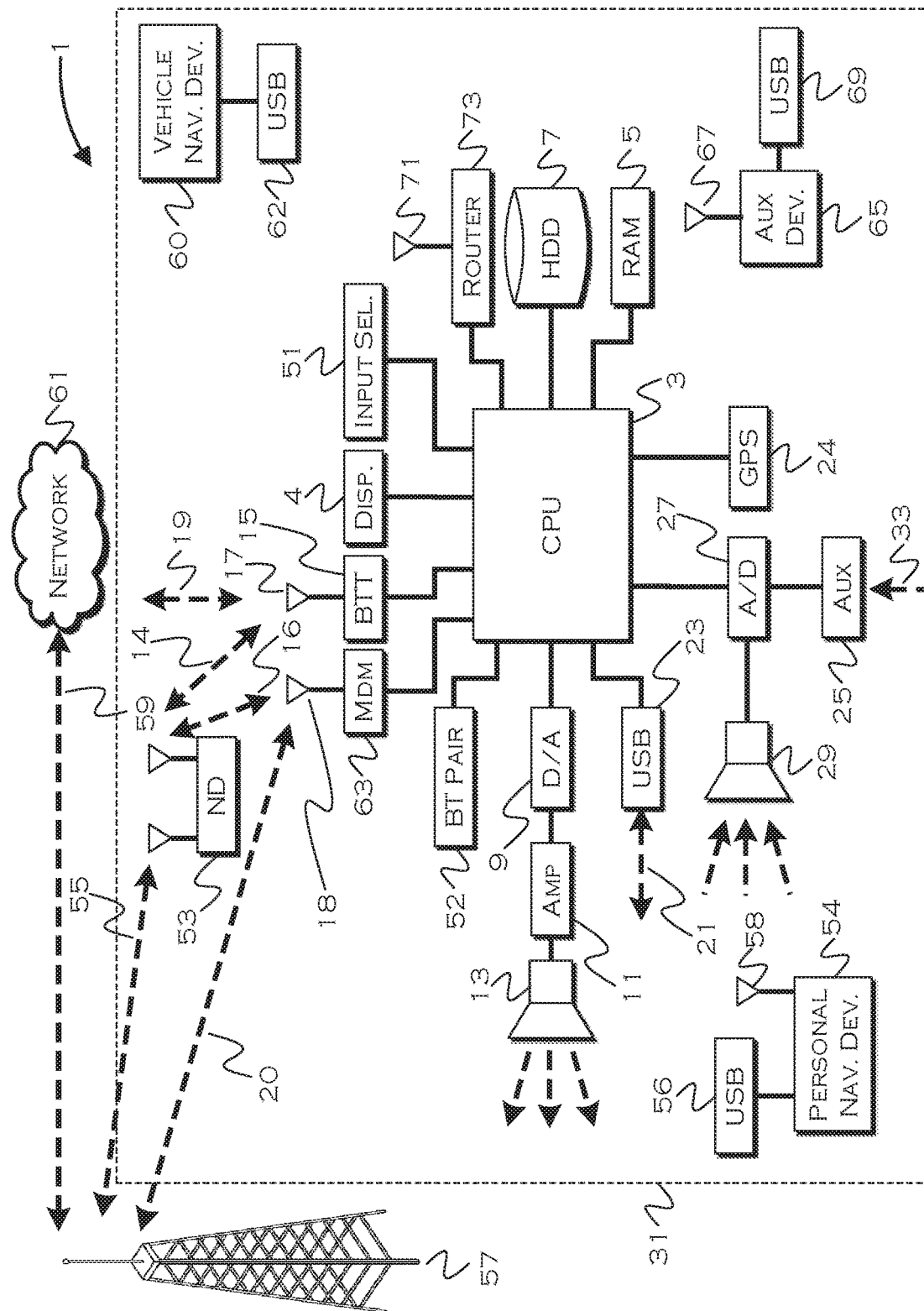
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose connection and retry strategies which accommodate a full-power/standby mode and a low-power mode where the focus is at least partially on power preservation.

In the full-power/standby mode, the illustrative process is designed to be resilient to possible failure scenarios and, at the same time, optimize available network resources and comply with carrier requirements. Since there may be a fine line between efficiently re-requesting for a network resource and being considered aggressive by the network, the dynamic strategy includes attempting to activate PDN connectivity for three (or other reasonable number) times at configurable "Short PD Delay Timer" intervals, then resetting the "network access device" to resolve any possible modem internal failure or application-to-modem failure, then attempting for a fourth time. During this first phase of the strategy, a burst timer may be running to calculate the period of time taken to accomplish this phase. The value of the burst timer is subtracted from a configurable "long PD delay" timer, and the modem waits for the remainder of the long delay, then repeats the strategy.

In the low-power mode, a point of focus includes consumption of as little power as possible, while maintaining an efficient connection mechanism. Thus, the TCU does not reattempt a packet connection request to a network "Access Point" when the TCU encounters a failure on that level. At the same time, the TCU may tolerate a configurable timer delay "Connection Timeout" for the network to establish the session with the MQTT, and in case of a failure, it may retry for a configurable number of attempts.

Figure 2:
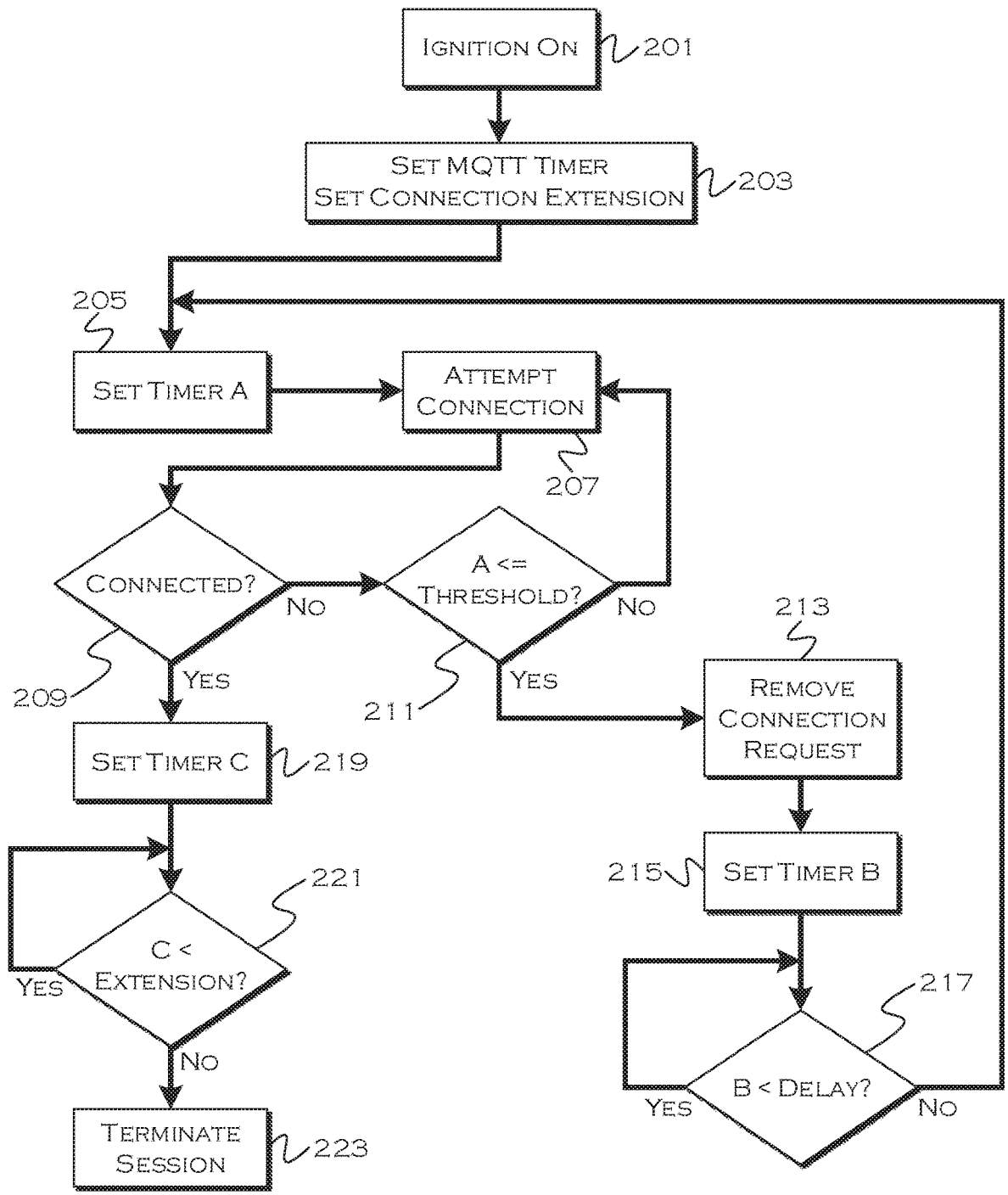
FIG. 2 shows an illustrative process for MQTT connection attempts.

FIG. 2 shows an illustrative process for MQTT connection attempts. In this example, the process detects 201 an ignition-on state. Thus, the process may attempt the MQTT connection when a driver starts the vehicle. Before requesting the MQTT connection, the process may initialize any variables that are used in the process. These may include user/OEM-configurable variables and, in this case, the variables include a delay timer value and a connection extension time value.

The process requests an MQTT connection, and sets 205 a first timer A. The process uses this timer to determine the amount of time the connection attempt is pending before the process removes the MQTT request. In this example, the timer may be set to 30 seconds, although any suitable timer value may be used. During the 30 second run-off, the process attempts 207 to connect to the MQTT broker.

If the connection attempt is unsuccessful 209, the process determines 211 if the timer A has expired. As long as time remains, the process continues the connection attempt. Once the timer expires, the process removes 213 the connection attempt and initiates 215 a second timer B. This second timer is a delay timer, and represents the amount of delay before the process retries the connection attempt. Once timer B expires and the appropriate delay is achieved 217, the process retries 205 the connection attempt. In this example, the amount of time that timer B runs for is determined based on comparison to the delay timer value discussed above. The delay may be preconfigured, for example, based on a reasonable expected MQTT response time.

If the connection attempt is successful within the time set by timer A, the process initiates 219 a timer C, which is the amount of time that the MQTT session will exist following an ignition off state. The process compares 221 the time that timer C has run to the value set for the connection extension time value, to determine if the MQTT session should persist. Once the value of timer C exceeds the extension value, the process terminates 223 the MQTT session.

Figure 3:
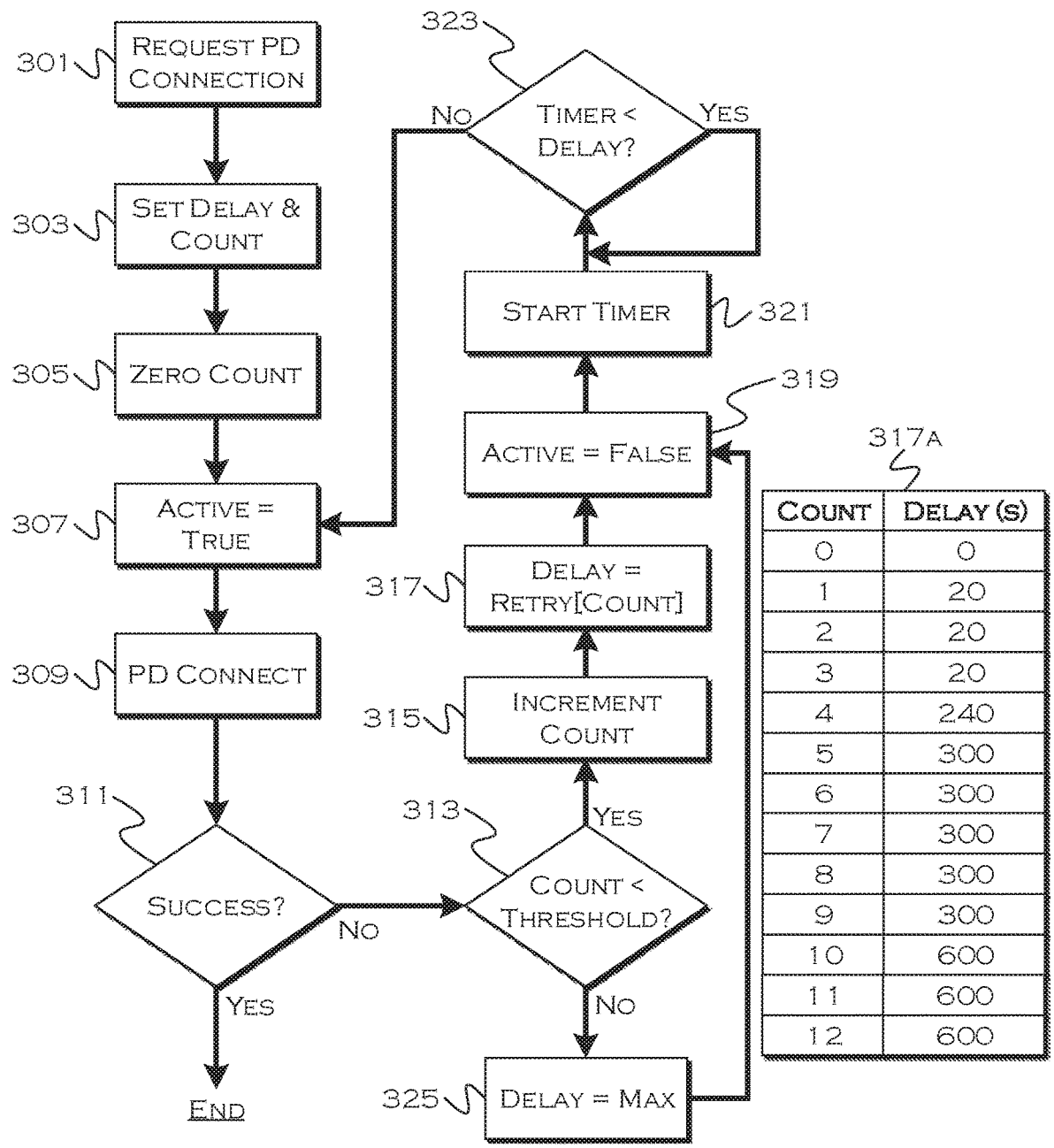
FIG. 3 shows an illustrative reconnection attempt process.

FIG. 3 shows an illustrative reconnection attempt process. This process may be similar to existing reconnection attempt processes. In this example, the process requests 301 a packet data (PD) connection. Similar to FIG. 2, the process initializes 303 any variables that are needed for execution. These values may be based on user or OEM configured values for the variables, and in this example the values include a delay timer and a total attempt count.

In this example, the process zeros 305 an attempt counter and sets 307 an active variable to "true." This indicates that a packet data connection is still needed. The process then attempts 309 to establish the PD connection. If successful, the process exits, having established the desired connection.

If the connection attempt is unsuccessful, the process determines 313 if the attempt counter is below the total attempt count configurable threshold. If the counter is above the threshold, the process sets 325 the delay timer to a configurable predetermined value. If the counter is below the threshold maximum count, the process increments 315 the counter and references 317 a lookup, based on the counter value, to determine an appropriate delay time.

In this example, an illustrative lookup table is shown in FIG. 3 as 317a. As can be seen from table 317a, the delay value gradually increments as the count increases. This means that successive attempts experience increasing delays before activating.

After setting the appropriate time for delay, the process sets 319 the active flag (indicating an ongoing connection attempt) to false. The process then activates 321 a timer which executes until the timer value exceeds 323 the set delay value. Then the connection attempt repeats.

Figure 4:
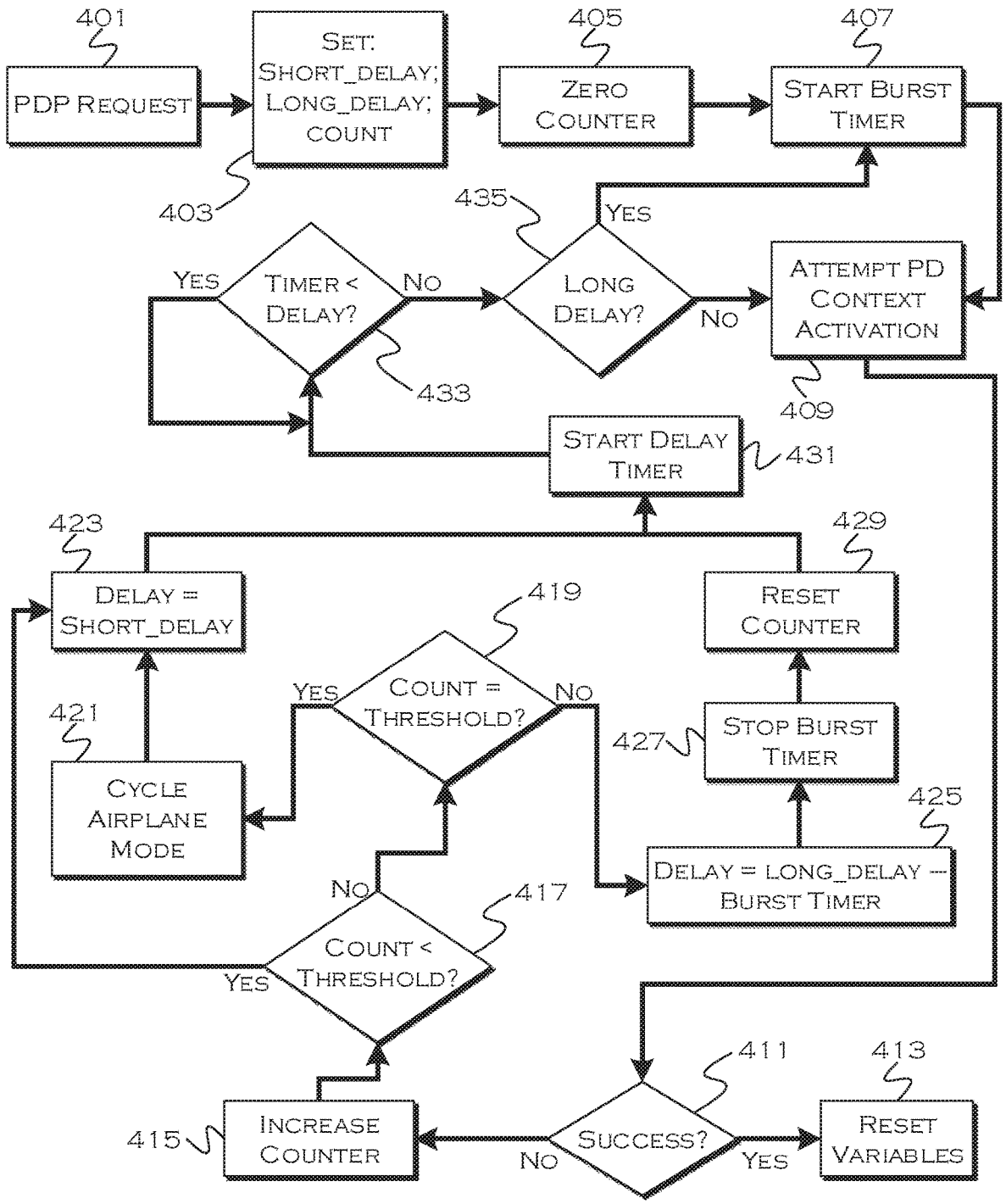
FIG. 4 shows another illustrative reconnection attempt process.

FIG. 4 shows another illustrative reconnection attempt process. This process represents an alternative to the process shown in FIG. 3, and it may achieve some efficiencies not achievable through the process of FIG. 3. In this example, the process receives 401 a request to activate a PDP context or PD connection attempt.

Again, the process initializes 403 a set of useful variables that are also again user/OEM configurable. In this example, the process sets a short delay, a long delay and a count value. The process also zeros 405 an attempt counter and initializes 407 a burst timer.

In this example, the process uses the burst counter to measure the total amount of time that the burst of requests took. This value is then subtracted from the delay timer to obtain a delay value that accommodates for an amount of time occupied by the burst attempts.

The process attempts 409 a PD context activation/PD connection attempt. For LTE communication over a default bearer (the always-on logical path between the TCU and wireless network gateway), this activation can include the TCU application requesting a connection to a modem TCP/IP stack, followed by use of Jasper access point name (APN) to reach the MQTT broker. For LTS connections with extra bearers (e.g., Wi-Fi), this could include setting up a new bearer channel. For 3G communication, this could include PD context activation and acquisition of an IP address.

Failure under the preceding circumstances may vary based on attempted connection type. For LTE communication, a common failure may relate to an internal TCU/Modem interface problem. For 3G and LTE communication with extra bearers, failure could be cause by a network issue.

If the connection attempt is successful 411, the process resets 413 all counters and timers and/or abandons the values thereof. If the connection attempt is unsuccessful, the process may increase 415 an attempt counter. If the attempt count is still below 417 the defined threshold, the process may set 423 the delay to the short delay value (since the number of total burst attempts has not yet been attempted). If the attempt counter is at 419 the threshold (the last burst attempt), the process may attempt a rest by cycling 421 airplane mode (disabling all connectivity) and then setting 423 the delay value to the short timer. This periodic reset addresses any issues that may be cured by resetting the system, which is lacking in the preceding figure.

If the attempt count has exceeded the threshold, the process may set 425 the delay value based on the long delay value less the current burst timer value (the duration of the previous connection attempts in the burst). The process then stops 427 the burst timer and resets 429 the attempt counter.

At this point, whether the delay was set to the long delay or short delay, the process begins 431 a delay timer for the duration 433 specified by the delay setting. Once the delay has lapsed, the process determines 435 if the delay corresponded to a long delay or short delay. If the delay was a long delay, the process loops back to resetting the burst timer 407, whereas if the delay was a short delay (an attempt within the number of permissible burst attempts), the process loops back to the attempt to activate the PD context 409. In the latter case, the burst delay timer is still measuring the total amount of time for the burst.

Figure 5:
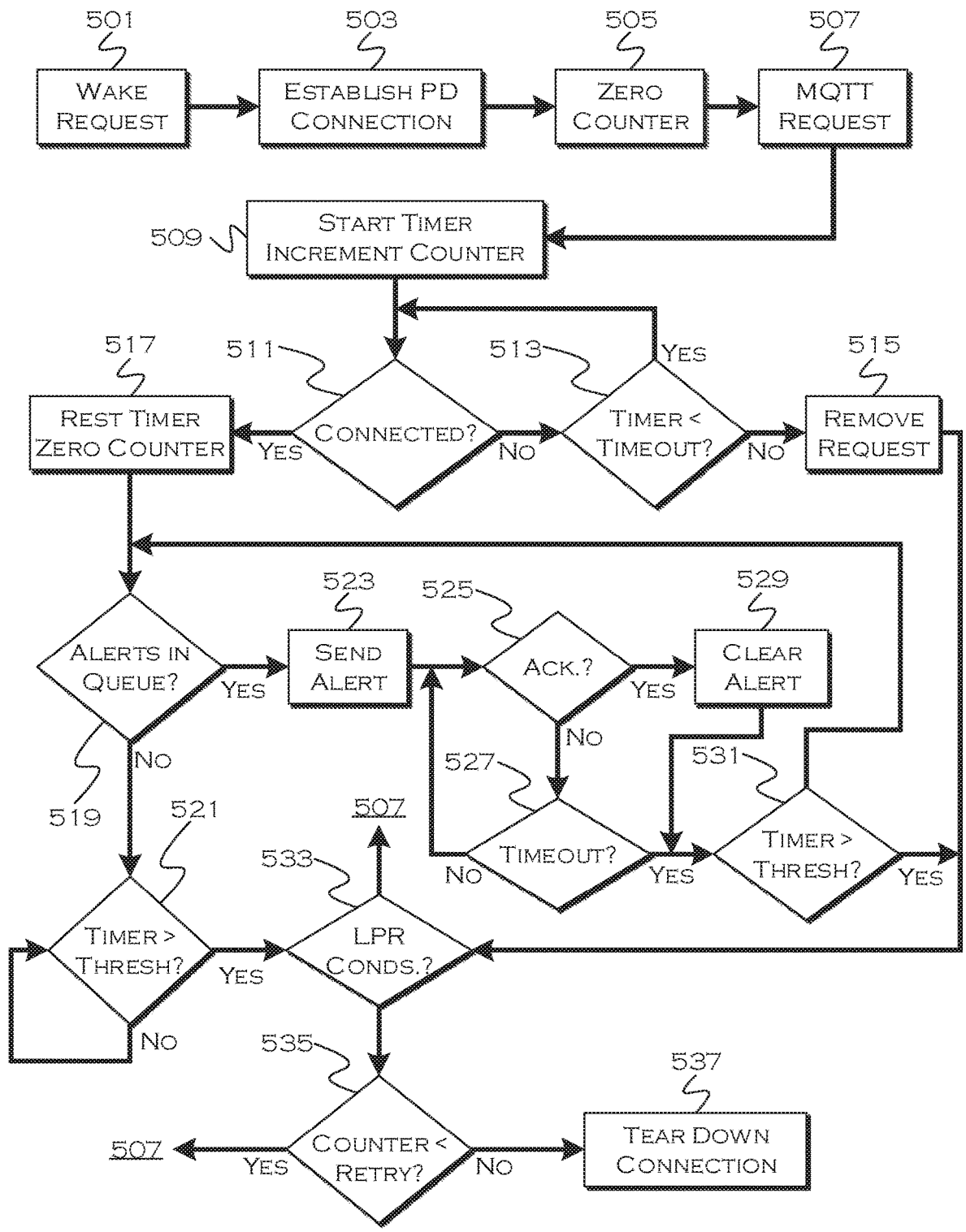
FIG. 5 an illustrative MQTT retry process.

FIG. 5 an illustrative MQTT retry process. In this example, the process includes a wake and an alert check process. This process is useful when the vehicle is in a low-power state, such as when the vehicle is not powered, for example. The vehicle may detect an alert or otherwise receive a wake command, and in either instance may require use of a connection for reporting.

In this example, the process receives 501 an awake command and establishes 503 a PD connection. The process also zeros 505 a counter for MQTT request attempts and issues 507 an MQTT broker connection attempt.

The process starts 509 a timer and increments a counter, and then waits to see if the connection attempt was 511 successful. If the process does not connect, the process determines 513 if the timer has reached a threshold value. If the process reaches the timer threshold without connection, the process removes 515 the connection attempt request and proceeds to determine 533 if low power registered (LPR) conditions are met, which will be discussed below. For edification, FPO stands for full power on, and FPS stands for full power standby.

If the process is able to connect, the process resets 517 the timer and zeros the attempt counter. The process will also restart the timer, for use in tracking the length of the MQTT session. The connected process determines 519 if there are any alerts pending in a queue. If not, the process keeps 521 the MQTT connection alive for a specified timer amount. This can allow any alerts occurring during that time to be immediately queued. Once the timer expires, the process checks to see if the LPR conditions are met. If there is one or more alert in the queue, the process sends 523 the alert to the appropriate party. The process then waits 525 until the alert is acknowledged, at which point the process clears 529 the alert from the queue. While the process is waiting, the process considers whether 527 a timeout occurs. This alert issuance and waiting period continues until 531 the running timer exceeds the MQTT threshold. At that point, the process considers 533 if conditions for LPR are met.

If the conditions for LPR are met, the process will retry connection attempts 535 as long as the attempt counter is below a designated retry threshold. If the count exceeds 535 the threshold, the process will tear down 537 the PD connection and end. If the conditions are not met for LPR (if the vehicle is in full power), the process will maintain the connection if established or persist in connection attempts if the connection is not yet established.

Through the use of the illustrative embodiments, resilient and robust connection attempts and reconnection attempts can be processed in full or low power vehicle states. At the same time, delays may be minimized and accommodation may be made for resets required to fix certain problems. This helps minimize customer delay and possible annoyance, while providing consistent connectivity.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A computer implemented method, executed by a vehicle processor, comprising:

waking a powered down vehicle including the processor;

requesting an MQTT connection from the vehicle;

waiting, for a predetermined timeout period based on expected connection time, until the requested MQTT connection is established;

starting a timer at the vehicle responsive to establishing the MQTT connection;

sending any vehicle alerts pending in a queue, following MQTT connection establishment;

ending the MQTT connection, following expiration of the timer unless the vehicle has been powered before the timer expired;

removing an MQTT connection request, following expiration of the predetermined timeout period and if the MQTT connection has not been established;

requesting a new MQTT connection responsive to detecting that the vehicle has been powered; and requesting a new MQTT connection responsive to determining that a retry counter has not been exceeded by a number of previous connection attempts, response to the vehicle remaining powered down.

2. The method of claim 1, wherein the waking is responsive to a wake up request received by the vehicle from a remote source.

3. The method of claim 2, wherein the waking is responsive to an SMS message.

4. The method of claim 1, wherein the waking is responsive to an occurrence of an alert condition onboard the vehicle.

* * * * *